Feb. 11, 1947.  P. L. ESLER  2,415,476
ELECTRICALLY HEATED SOLDERING IRON
Filed Jan. 22, 1945
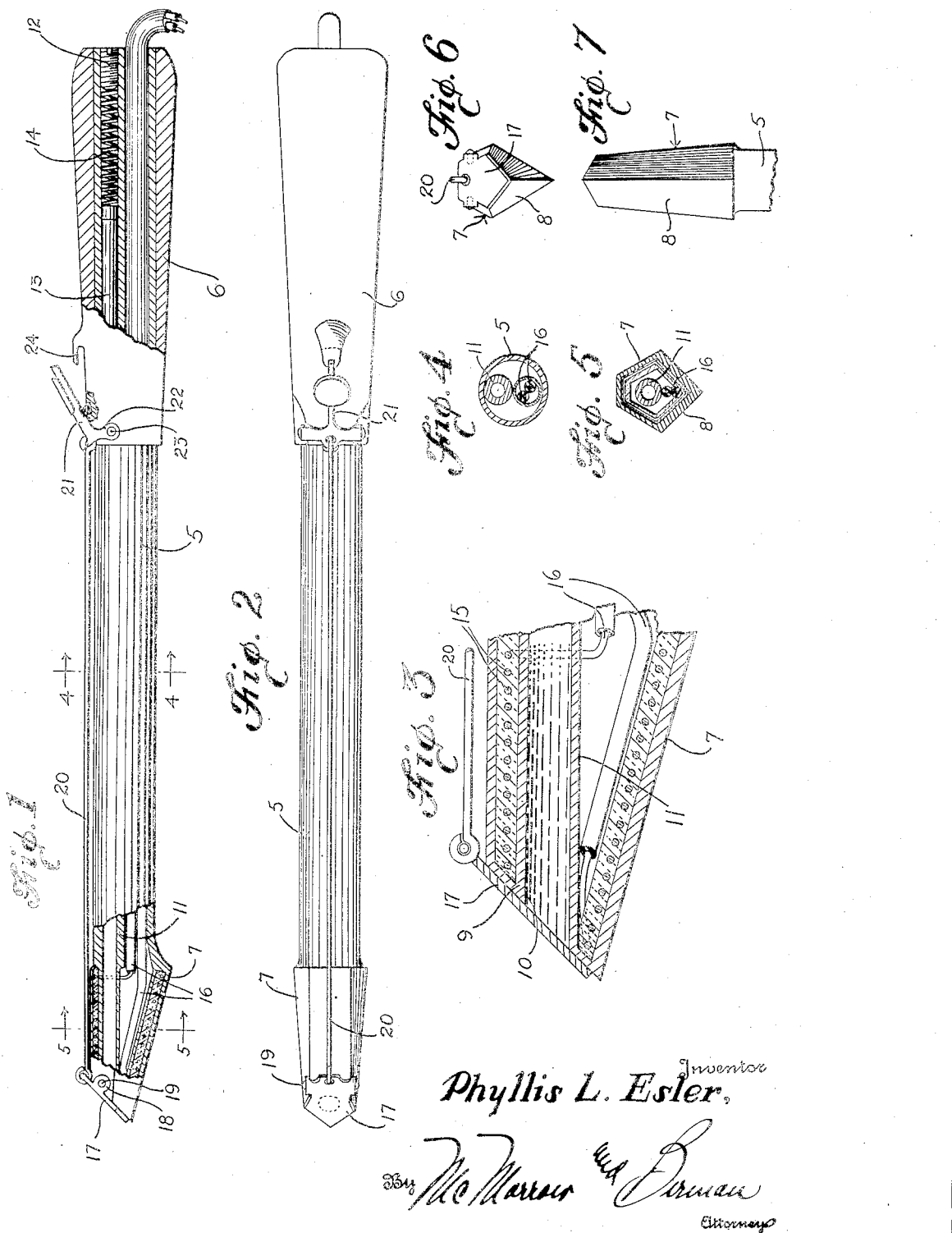
Phyllis L. Esler, Inventor Patented Feb. 11, 1947

2,415,476

UNITED STATES PATENT OFFICE 2,415,476

ELECTRICALLY HEATED SOLDERING IRON

Phyllis L. Esler, Detroit, Mich.

Application January 22, 1945, Serial No. 573,877

1 Claim. (Cl. 219—27)

1

The present invention relates to new and useful improvements in soldering irons and has for its primary object to provide means for carrying a stick of solder in the iron together with an electrically heated head at the outer end of the iron by means of which the solder may be melted and discharged onto the work.

An important object of the present invention is to provide a pivoted closure for the discharge end of the iron to control the volume of melted solder discharged or dispensed from the iron together with means carried by the handle of the iron for moving the closure into open and closed position.

Another object of the invention is to provide a tube extending longitudinally of the iron and in which a stick of solder may be placed, the front end of the tube being subjected to the heat at the discharge end of the iron to melt the solder and also providing spring means at the rear end of the tube to project the stick of solder forwardly.

Another object of the invention is to provide an electrically heated head at the front end of the iron and forming the head with flat surfaces constituting spreaders for spreading the melted solder upon the work.

Another object of the invention is to provide a time saving tool of this character by means of which the iron may be connected to an electric outlet plug in the usual manner and the self-contained iron heated to melt the solder contained therein for applying the solder to a desired part of the work, thus leaving one hand of the operator free to handle the work or for other purposes during the soldering operation.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which Figure 1 is a side elevational view with parts broken away and shown in section.

Figure 2 is a top plan view.

Figure 3 is an enlarged longitudinal sectional view of the head of the iron.

Figures 4 and 5 are transverse sectional views

2 taken respectively on the lines 4—4 and 5—5 of Figure 1.

Figure 6 is a front elevational view, and

Figure 7 is a bottom plan view of the head of the iron.

Referring now to the drawing in detail wherein for the purpose of illustration I have disclosed a preferred embodiment of the invention, the numeral 5 designates a tubular soldering iron having a handle 6 attached at its rear end, the handle preferably being constructed of wood or other suitable heat insulation material.

The front end of the iron is formed with a head 7 having a substantially V-shaped bottom 8 formed with flattened surfaces and tapering toward the front end of the head. The front end of the head is formed with a rearwardly sloping front wall 9 having a discharge opening 10 formed therein.

A tube 11 extends longitudinally of the iron 5 and through the handle 6, the front end of the tube communicating with the opening 10 and the rear end of the tube being closed by a threaded plug 12. The tube is adapted to contain a stick of solder 13 projected forwardly by means of a coil spring 14 positioned in the tube between the rear end of the stick of solder and the plug 12.

The tube is spaced from the wall of the iron and surrounding the front end of the tube is an electric heating coil 15 having the electric wires 16 connected thereto and extending rearwardly through the tube and outwardly through the rear end of the handle 6 for attaching to a suitable electric outlet.

As more clearly illustrated in Figure 3 of the drawing, a portion of the coil 15 is in close contact with the upper surface of the tube 11 while the remaining portion of the coil is positioned in close contact with the inner surfaces of the bottom 8 of the head of the iron.

Accordingly, the coil is adapted to heat the front end of the tube 11 to melt the solder therein whereupon the melted solder may be discharged through the opening 10 on to the work and the bottom of the soldering iron will also be effectively heated and the bottom surfaces 8 of the head of the iron used to spread the solder on the work and to maintain the discharged solder in a plastic state while being spread on the desired part of the work.

A flat closure cover 17 is positioned against the sloping front wall 9 of the head, the side edges of the closure being provided with a pair of rearwardly extending apertured ears 18 pivoted to the side of the head by pins 19. The upper edge of the head projects upwardly above its pivotal connection to a point above the top of the head and a rod 20 extending longitudinally along the top of the iron is pivotally attached at its front end to the upper portion of the cover.

A manipulating lever 21 has its front end pivotally attached to the rear end of the rod 20, the lever being formed with downwardly extending ears 22 pivoted to the side of the handle 6 on pins 23.

The lever 21 extends rearwardly in an upwardly inclined position on top of the handle 6 while the closure 17 is in its closed position whereby a downward movement of the lever will operate the cover 17 to permit discharge of melted solder from the front end of the head.

The lever 21 is constructed of material sufficiently flexible to permit movement of the rear end thereof laterally for engaging under a catch 24 secured to the upper surface of the handle 6 whereby to secure the lever in its lowered position and to maintain the cover 17 raised or open when desired.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though I have herein shown and described a preferred embodiment of my invention that the same is susceptible to certain changes fully comprehended by the spirit of the invention as herein described and the scope of the appended claim.

Having thus described the invention, what I claim is:

A soldering iron of hollow construction, a head on the front end of the iron having an opening therein, a handle attached at the rear end of the iron, a tube positioned longitudinally in the iron with its front end communicating with said opening and its rear end extending through the handle, said tube being adapted to contain a stick of solder, an electric heating coil in the head surrounding the front end of the tube, a closure for the opening and pivoted to the head for vertical swinging opening and closing movement, a lever pivoted on the handle and operatively connected to the closure to open and close the latter, and a catch on the handle adapted for engaging the lever to secure the lever in a position with the closure open.

PHYLLIS L. ESLER.

REFERENCES CITED

The following references are of record in the file of this patent:

UNITED STATES PATENTS

| Number | Name | Date |
| --- | --- | --- |
| 1,186,773 | Harris | June 13, 1916 |
| 1,237,290 | Browning | Aug. 21, 1917 |
| 1,449,517 | Lame | Mar. 27, 1923 |